(12) United States Patent
Snowbarger

(10) Patent No.: US 8,104,495 B2
(45) Date of Patent: Jan. 31, 2012

(54) VERSATILE EMERGENCY SHUTDOWN DEVICE CONTROLLER IMPLEMENTING A PNEUMATIC TEST FOR A SYSTEM INSTRUMENT DEVICE

(75) Inventor: Jimmie L. Snowbarger, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 135 days.

(21) Appl. No.: 12/582,126

(22) Filed: Oct. 20, 2009

(65) Prior Publication Data

US 2010/0037960 A1    Feb. 18, 2010

Related U.S. Application Data

(60) Division of application No. 11/426,109, filed on Jun. 23, 2006, now Pat. No. 7,621,293, which is a continuation-in-part of application No. 10/117,007, filed on Apr. 5, 2002, now Pat. No. 7,079,021.

(60) Provisional application No. 60/281,852, filed on Apr. 5, 2001, provisional application No. 60/760,665, filed on Jan. 20, 2006.

(51) Int. Cl.
*F16K 31/12* (2006.01)

(52) U.S. Cl. .......... 137/1; 137/82; 137/487.5; 137/492

(58) Field of Classification Search ............... 137/1, 82, 137/84, 85, 86, 487.5, 488, 492
See application file for complete search history.

(56) References Cited

U.S. PATENT DOCUMENTS

| 3,829,842 A | 8/1974 | Langdon et al. |
| 4,428,223 A | 1/1984 | Trevisan |
| 4,556,956 A | 12/1985 | Dickenson et al. |

(Continued)

FOREIGN PATENT DOCUMENTS

CN    1463395 A    12/2003

(Continued)

OTHER PUBLICATIONS

Flanders et al., "Smart ZV's—The Smart Choice for Emergency Isolation Valve Funtional Testing," *Saudi Aramco Journal of Technology*, pp. 39-44 (1999).

(Continued)

*Primary Examiner* — Stephen M Hepperle
*Assistant Examiner* — William McCalister
(74) *Attorney, Agent, or Firm* — Marshall, Gerstein & Borun LLP

(57) ABSTRACT

A multi-functional or versatile emergency shutdown valve controller may be used in various different emergency shutdown configurations to enable the testing of different types and configurations of emergency shutdown devices and the supporting equipment associated therewith. In one example, a digital valve controller for use with an emergency shutdown valve includes two pressure sensors and is adapted to be connected to a pneumatic valve actuator and to a solenoid valve device to assist in the on-line testing of the valve actuator as well as in the on-line testing of the solenoid valve. To perform testing of the solenoid valve, the valve controller may measure the pressure at different ports of the solenoid valve as the solenoid valve is actuated for a very short period of time. The valve controller may determine whether the solenoid device is fully functional or operational based on the derivative of the difference between the measured pressure signals, i.e., based on the rate of change of the difference between the measured pressure signals over time.

15 Claims, 4 Drawing Sheets

U.S. PATENT DOCUMENTS

| | | | |
|---|---|---|---|
| 4,557,136 | A | 12/1985 | Greenhalf |
| 5,000,040 | A | 3/1991 | Charbonneau et al. |
| 5,109,692 | A | 5/1992 | Fitzgerald |
| 5,154,314 | A | 10/1992 | Van Wormer |
| 5,197,328 | A | 3/1993 | Fitzgerald |
| 5,425,270 | A | 6/1995 | McDonald et al. |
| 5,434,774 | A | 7/1995 | Seberger |
| 5,469,737 | A | 11/1995 | Smith et al. |
| 5,568,376 | A | 10/1996 | Benmergui et al. |
| 5,573,032 | A | 11/1996 | Lenz et al. |
| 5,637,520 | A | 6/1997 | Cappelletti et al. |
| 5,870,317 | A | 2/1999 | Barnett et al. |
| 5,970,430 | A | 10/1999 | Burns et al. |
| 6,026,352 | A | 2/2000 | Burns et al. |
| 6,096,604 | A | 8/2000 | Cha et al. |
| 6,119,047 | A | 9/2000 | Eryurek et al. |
| 6,119,515 | A | 9/2000 | Kemmler et al. |
| 6,176,247 | B1 | 1/2001 | Winchcomb et al. |
| 6,186,167 | B1 | 2/2001 | Grumstrup et al. |
| 6,390,114 | B1 | 5/2002 | Haandrikman et al. |
| 6,466,893 | B1 | 10/2002 | Latwesen et al. |
| 6,862,547 | B2 | 3/2005 | Snowbarger et al. |
| 7,079,021 | B2 | 7/2006 | Snowbarger et al. |
| 2002/0161940 | A1 | 10/2002 | Eryurek et al. |
| 2003/0062494 | A1 | 4/2003 | Snowbarger et al. |

FOREIGN PATENT DOCUMENTS

| | | |
|---|---|---|
| CN | 1509428 A | 6/2004 |
| DE | 196 43 297 C1 | 3/1998 |
| JP | 08-193502 A | 7/1996 |
| JP | 2004-533681 A | 11/2004 |
| WO | WO-94/28341 A1 | 12/1994 |
| WO | WO-00/52374 A1 | 9/2000 |
| WO | WO-02/082193 | 10/2002 |

OTHER PUBLICATIONS

International Search Report for Application No. PCT/US06/47356, dated May 15, 2007.

International Search Report for Application No. PCT/US02/10758, dated May 4, 2002.

International Search Report for Application No. PCT/US02/10790, dated Jul. 16, 2002.

Official Office Action for U.S. Appl. No. 11/426,109, dated Oct. 21, 2008.

Official Office Action for U.S. Appl. No. 11/426,109, dated Apr. 30, 2009.

English translation of Chinese Office Action for Patent Application No. 200680051502.0, dated Nov. 27, 2009.

Office Action for European Patent Application No. 06 845 278.8-2422, dated May 2, 2011.

Notice of Reasons for Rejection for Japanese Application No. 2008-551266, dated Jul. 19, 2011.

VERSATILE EMERGENCY SHUTDOWN DEVICE CONTROLLER IMPLEMENTING A PNEUMATIC TEST FOR A SYSTEM INSTRUMENT DEVICE

CROSS-REFERENCE TO RELATED APPLICATIONS

This is a divisional of U.S. patent application Ser. No. 11/426,109, filed Jun. 23, 2006, which (1) is based on and claims priority to U.S. Provisional Patent Application No. 60/760,665, filed Jan. 20, 2006, and (2) is a continuation-in-part of U.S. patent application Ser. No. 10/117,007, filed Apr. 5, 2002, which is based on and claims priority to U.S. Provisional Patent Application Ser. No. 60/281,852, filed Apr. 5, 2001. The entire disclosure of each of the foregoing documents is hereby expressly incorporated herein by reference.

TECHNICAL FIELD

This patent generally relates to emergency shutdown systems used in process control environments and more particularly to a versatile controller for use in the testing and diagnostics of emergency shutdown devices and supporting equipment used in a process control environment.

BACKGROUND

Safety instrument systems typically incorporate emergency shutdown valves which are normally in a fully opened or a fully closed state and are controlled by a logic solver, a Programmable Logic Controller (PLC), or an emergency shutdown controller of some type to change states in the event of an emergency situation. To ensure that these valves can function properly, process control system operators typically periodically test the emergency shutdown valves by running these valves through a stroke test, which partially or completely opens or closes the valve. Because these tests are typically performed while the process is operating on-line or is operational, it is important to perform any test reliably and then return the valve to its normal state as quickly as possible. In this context, the term "normal state" refers to the position or state of the emergency shutdown valve when there is no emergency and the emergency shutdown valve is not being tested, i.e., when the process is operating normally.

In many cases, the emergency shutdown tests are performed at predetermined intervals by remotely located controllers. For example, emergency shutdown tests may be performed only a few times each year due to cumbersome test procedures and issues related to manpower. Also, during emergency shutdown tests, the emergency shutdown valve, or other emergency shutdown device being tested, is not available for use if an actual emergency event were to arise. However, limited, periodic testing is not an efficient way of verifying the operability of an emergency shutdown test system. As a result, digital valve controllers have been, in some cases, programmed to assist in the operation of the valve test to make the testing more automatic, user friendly and reliable.

Additionally, it is typically important that any emergency shutdown system be able to activate an emergency shutdown device (an emergency shutdown valve, for example) to its safe condition even when commanded by the emergency shutdown controller to do so in the unlikely but possible situation where an emergency event occurs during an emergency shutdown device test. In this context, the term "safe condition" refers to the position of the emergency shutdown device that makes the process plant or portion of the process plant "safe." Typically, this safe position is associated with a position of the shutdown device that shuts down or halts some portion of the process plant.

While there are many systems that test the ultimate emergency shutdown device, such as an emergency shutdown valve, itself, in many cases there is supporting equipment associated with the emergency shutdown device that should also be tested to assure the complete operability of the emergency shutdown capabilities at any particular plant location. For example, in some pneumatic valve configurations, a solenoid valve is connected between a pneumatic valve actuator of an emergency shutdown valve and an emergency shutdown controller to redundantly control the operation of the valve actuator in response to signals from the emergency shutdown controller. While the emergency shutdown valve may be functional, it is possible for the solenoid device to become defective and therefore not operate properly as a redundant method of actuating the emergency shutdown valve. In some cases, an improperly operating solenoid device may even prevent the emergency shutdown valve from actuating properly when the emergency shutdown controller sends a shutdown signal to the valve controller for the emergency shutdown valve.

While it is possible to develop and provide specialized equipment at each emergency shutdown location within a plant to perform testing of each different emergency shutdown device and its supporting equipment, it is more desirable to provide a universal or generic set of equipment that may be used in many different situations to test different types of emergency shutdown devices and the supporting equipment associated therewith or to perform other functions in the plant. For example, it is desirable if such versatile equipment is able to control and test different types of emergency shutdown valves and solenoid valve configurations while simultaneously or alternatively operating as part of a closed loop distributed process control system.

SUMMARY

A multi-functional or versatile emergency shutdown device controller, such as an emergency shutdown valve controller, may be used in various different emergency shutdown configurations to enable the control and testing of different types and configurations of emergency shutdown devices and the supporting equipment associated therewith while also being able to be used in other plant configurations, such as in closed loop process control configurations. In one example, a digital valve controller for use with an emergency shutdown valve includes two pressure sensors and is adapted to be connected to a pneumatic valve actuator and to a solenoid valve device to assist in the on-line testing of the valve actuator as well as the on-line testing of the solenoid valve.

To perform testing of the solenoid device, the valve controller may measure the pressure at different ports of the solenoid valve as the solenoid valve is actuated for a very short period of time. The valve controller may determine whether the solenoid device is fully functional or operational based on the derivative of the difference between the measured pressure signals, i.e., based on the rate of change of the difference between the measured sensor signals over time. In this case, the digital valve controller, or an emergency shutdown test system connected to the digital valve controller, may determine that the solenoid is in acceptable operational condition if the absolute value of the determined derivative is greater than a predetermined threshold and may determine that a problem exists with the solenoid valve if the absolute value of the determined derivative is less than the same or a different predetermined threshold.

In one case, the digital valve controller may be used as a pressure transducer to control a valve based on measurements of the pressure supplied to the valve actuator which may be, for example, a spring and diaphragm type of valve actuator. In this case, the digital valve controller may use both of the pressure sensors, one to perform control of the valve and the other to perform testing of the solenoid. Alternatively, the digital valve controller may use one of the pressure sensors to perform pressure based control, i.e., within the servo control loop of the valve, and may use the other pressure sensor, not to test the solenoid valve, but to measure some other pressure signal within the process plant. This other pressure signal need not be associated with the control or testing of the emergency shutdown device or its associated equipment. In another case, the digital valve controller can use one of the pressure sensors to control or limit an amount of force used to test the valve. So configured, the digital valve controller can minimize inadvertent effects on the process by overmodulating the valve position during the test.

In another case, the digital valve controller may be used as a positioner and control movement of the valve based on position measurements provided to the digital valve controller by position sensors. In this case, the digital valve controller may use one of the pressure sensors to perform testing of the solenoid or other equipment associated with the emergency shutdown device and may use the second pressure sensor to sense a further pressure signal not needed within the servo control loop of the emergency shutdown device or for the testing of the emergency shutdown device. In this case, for example, the second pressure sensor of the digital valve controller may be connected to another location within the process plant, such as to a fluid line output from the emergency shutdown valve, to provide a process variable signal to the emergency shutdown controller or even to a process controller associated with normal control of the process.

Still further, the same digital valve controller may be used outside of an emergency shutdown device configuration and may control a valve using either pressure control (i.e., as a pressure transducer) or position control (i.e., as a positioner). In the former case, one of the sensors may be used to measure the pressure in the pneumatic loop of the valve for control purposes, i.e., as a pressure feedback, while the other of the sensors may be used to measure a pressure not associated with the valve or needed for controlling or testing the valve. In the latter case, both of the sensors may be used to measure pressures not associated with the valve or needed for controlling or testing the valve The emergency shutdown device controller may include a processor, a memory coupled to the processor, and a communication input coupled to the processor that is adapted to receive a test activation signal from, for example, an emergency shutdown controller, a user, etc. One or more first test routines are stored in the memory and each is adapted to be executed on the processor to cause an emergency shutdown test of some kind to be performed in response to the receipt of an appropriate test initiation signal from, for example, the emergency shutdown controller. These test routines may be, for example, partial or full stroke test routines for the valve, test routines for the solenoid valve, etc. One or more second routines are stored in the memory and are adapted to be executed on the processor during the emergency shutdown test of, for example, a solenoid valve, to cause the one or more sensor outputs to be stored in the memory for subsequent retrieval and/or to be processed to determine the operational functionality of one or more devices, such as the solenoid valve, associated with the emergency shutdown device.

As noted above, the emergency shutdown device controller may include a communication unit, wherein the communication unit is coupled to the processor and communicates with a diagnostic device or a controller via a communication network or line using an open communication protocol, such as the HART protocol, the FOUNDATION® Fieldbus communication protocol or any other desired proprietary or non-proprietary communication protocol. The communication unit may, in some configurations, send one or more of the collected sensor signals to a further device within the process control system via the communication network or communication line.

DETAILED DESCRIPTION

In a multitude of industries, valves and other mechanical devices are used in process control systems to bring a variety of processes quickly into a safe state if an emergency situation arises. It is important to periodically test these valves and associated electro/mechanical devices to ensure that they are in proper functioning condition. For example, to verify the performance of an emergency shutdown valve, mechanical movement of the valve needs to be verified in a reliable and secure manner without unduly affecting the process. Additionally, if the valve has supporting equipment, such as attendant solenoids, etc., it is desirable to be able to test this supporting equipment in a safe and reliable manner while the process is operating on line, but in a manner that does not unduly upset the process.

Figure 1:
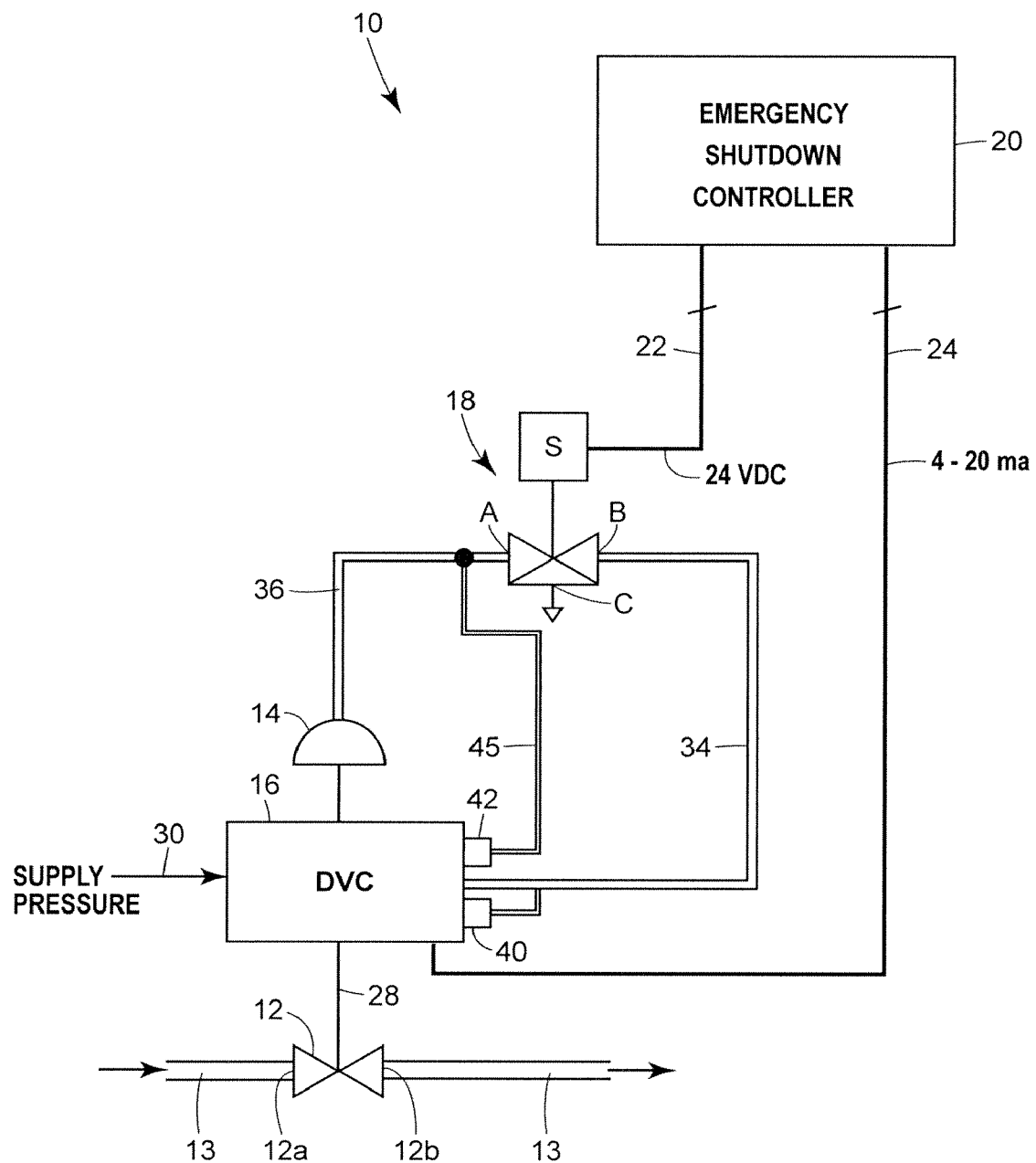
FIG. 1 is a schematic diagram of several components of an example emergency shutdown system including a pneumatic emergency shutdown valve, a valve actuator, a digital valve controller and a solenoid valve configured to perform emergency shutdown operations and tests.

FIG. 1 illustrates an example emergency shutdown system 10 that may be used to test the operation of an emergency shutdown valve 12 connected within a process plant. It will be appreciated by those skilled in the art that, while an emergency shutdown valve system is illustrated in the embodiment of FIG. 1, the emergency shutdown system 10 may include or be used to control other types of emergency shutdown devices, including other types of control devices, other types of valve devices, etc.

As illustrated in FIG. 1, the emergency shutdown valve 12 may be disposed within a fluid line in a process plant, such as in a pipeline 13 having a portion that supplies fluid to an inlet 12a of the emergency shutdown valve 12 and having a portion that receives fluid from an outlet 12b of the emergency shutdown valve 12. The emergency shutdown valve 12, which is actuated by a valve actuator 14, may be located normally in one of two positions, i.e., in a fully open position which permits fluid to flow freely between the inlet 12a and the outlet 12b, or in a fully closed position which prevents fluid from flowing between the inlet 12a and the outlet 12b. To ensure that the emergency shutdown valve 12 will properly function in a true emergency shutdown condition, the emergency shutdown valve 12 may be periodically tested by causing the valve actuator 14 to partially open or close the emergency shutdown valve 12, which is referred to as a partial stroke test. Of course, other types of tests may be performed to test the operational capabilities of the valve 12.

In the example system of FIG. 1, the emergency shutdown system 10 includes the valve actuator 14, illustrated as a pneumatically controlled actuator, and further includes a digital valve controller (DVC) 16 and a solenoid valve 18 which are pneumatically connected to the valve actuator 14 to control the operation of the valve actuator 14. Additionally, the DVC 16 and the solenoid valve 18 are communicatively connected to an emergency shutdown controller 20 via communication lines and/or power lines 22 and 24. In one embodiment, the DVC 16 may be the DVC6000 valve controller sold by Fisher Controls International LLC. In the embodiment of FIG. 1, the solenoid valve 18 has a solenoid S that is energized via a 24 volt DC power signal sent from the emergency shutdown controller 20 on the lines 22, while the DVC 16 communicates with the emergency shutdown controller 20 via a 4-20 milliamp communication line 24, which may be for example, a traditional 4-20 ma control line, a HART protocol line, etc. Of course, if desired, the DVC 16 could be communicatively connected to the emergency shutdown controller 20 via any other desired proprietary or non-proprietary communication network, such as a FOUNDATION® Fieldbus network, a Profibus communication network, or any other known or later developed communication network. Likewise, the solenoid S of the solenoid valve 18 may be connected to and receive control signals from the emergency shutdown controller 20 using any other desired communication or power signals provided on any desired or suitable communication or power lines.

The valve actuator 14 of FIG. 1 is illustrated as a spring and diaphragm type actuator which is configured to receive a pneumatic signal on one side (referred to herein as the top side) of a spring biased diaphragm (not shown), to cause movement of a valve stem 28 of the valve 12. If desired, however, the valve actuator 14 could be a one-sided or a two-sided piston type actuator or could be any other type of known pneumatic valve actuator. To control the actuator 14, the DVC 16 receives a pneumatic supply pressure signal from a supply line 30 and provides a pneumatic signal via a pneumatic line 34, a valve portion of the solenoid valve 18 and a pneumatic line 36 to the top side of the valve actuator 14. As will be understood, the DVC 16 controls movement of the valve actuator 14 by controlling the pressure provided to the top side of the actuator 14 to thereby control movement of the valve stem 28. Of course, the DVC 16 may cause movement of the diaphragm of the valve actuator 14 in response to control signals sent to the DVC 16 by the emergency shutdown controller 20 via the communication lines 24.

The DVC 16 may include a memory which stores one or more stroke tests, such as partial stroke tests or full stroke tests, for testing the valve 12, and the DVC 16 may initiate these tests in response to one or more test signals sent by the emergency shutdown controller 20, input by a user or an operator at the DVC 16 itself or provided to the DVC 16 in any other desired manner. Of course, the DVC 16 may be used to perform any known or desired test(s) on the valve 12 and the valve actuator 14 to assure the operability of these devices.

In safety instrumented systems that employ air-operated valve actuators, such as that illustrated in FIG. 1, the pneumatic solenoid valve 18 is often used as a redundant means of assuring that all air is evacuated from the actuator 14 when an emergency demand occurs, to thereby cause the valve/actuator combination to be forced to the emergency seat, i.e., into the safe state. Under normal, non-emergency conditions, the valve actuator 14 is pressurized to force the valve 12 against the normal or non-emergency seat, and the solenoid valve 18 is positioned to maintain pneumatic pressure in the actuator 14, and to allow the DVC 16 to adjust that pressure via the pneumatic line 34. In particular, in the embodiment of FIG. 1, during the normal operation of the emergency shutdown valve 12 (i.e., the normal, non-safe or non-shutdown state), the solenoid valve 18 connects a port A thereof, as shown in FIG. 1, to a port B to enable the DVC 16 to control the pressure in the line 36 and thereby control the pressure at the associated input of the valve actuator 14. However, during an emergency shutdown operation, the solenoid valve 18 actuates (usually based on the removal of the 24 volt DC power signal from the lines 22) to connect the port A to a port C of the solenoid valve 18 while simultaneously disconnecting the line 34 from the line 36. It will be understood that the port C is vented to the atmosphere. When this action occurs, the pressure supplied to the valve actuator 14 via the line 36 is vented to the atmosphere, causing the spring biased diaphragm and associated linkage within the valve actuator 14 to move the valve stem 28 and the valve plug from the normal seat to the emergency seat.

Thus, in normal operation, power is applied to and maintained at the input of the solenoid valve 18 to actuate the solenoid valve 18, allowing air, or other gas, to freely pass between solenoid ports A and B, which allows the DVC 16 to exchange air with the actuator 14 and thereby control the internal pressure at the top side of the valve actuator 14. When an emergency shutdown occurs, power is removed from the solenoid S of the solenoid valve 18, allowing a healthy solenoid valve 18 to move to the opposite position. This action closes off port B, and connects port A to port C, thereby allowing air within the valve actuator 14 to escape to the atmosphere. This operation can occur in conjunction with or as a redundant operation to the DVC 16 removing pressure from the line 34 (such as by venting this pressure to the atmosphere) which would also cause the valve actuator 14 to move the valve 12 to the emergency seat in the absence of movement of the solenoid valve 18.

As noted above, it is desirable to periodically test the solenoid valve 18 during normal operation of the plant to assure that, in the event of an actual emergency, the solenoid valve 18 will actuate as expected to actually disconnect the DVC 16 from the valve actuator 14 and to allow all or most gas/air to escape from the top side of the valve actuator 14, thus moving the valve 12 to the emergency seat position.

To assist in this testing procedure, the DVC 16 is provided with two pressure sensors 40 and 42 which are positioned to monitor the flow of air or other gas through the solenoid valve 18. In particular, the pressure sensor 40 monitors the valve controller output pressure provided at the solenoid valve port B, i.e., in the line 34, while the sensor 42 is fluidly connected to and monitors the valve actuator pressure at the solenoid valve port A. As illustrated in FIG. 1, the sensor 42 is fluidly connected to the port A of the solenoid valve 18 via a line 45. Additionally, the DVC 16 may be provided with a testing routine that may collect, store and process the measurements made by the sensors 40 and 42 to determine the operational capabilities of the solenoid valve 18 based on the measured pressure signals, as discussed in more detail below.

Generally speaking, during a test of the solenoid valve 18, the emergency shutdown controller 20 may remove power from the solenoid S of the solenoid valve 18 for a short period of time, thereby causing a healthy solenoid valve to actuate. At this time, the controller output pressure measured by the sensor 40 should remain nominally constant (because the DVC 16 will not vent the pressure in the line 34 to the atmosphere), while the pressure at port A measured by the sensor 42 will fall rapidly as the valve actuator 14 evacuates. Generally speaking, the mechanical health of the solenoid valve 18 may be estimated by inferring the rate and extent of travel as the solenoid valve 18 transitions from one position to the other. This inference may be made by continuously monitoring or determining the absolute value of the difference between pressures measured by the sensors 40 and 42 as a function of time.

More particularly, if the solenoid valve 18 only partially actuates, it will not fully open or close the ports A, B and/or C. Such attenuated solenoid travel will reduce the rate of the evacuation of the valve actuator 14, causing a slower rate of change in pressure at port A than would occur with a healthy or normally operating solenoid valve 18. Depending on solenoid valve constructions, such partial actuation may also partially open the port B to the atmosphere, causing the port B pressure, as measured by the sensor 40, to drop as well (instead of staying the same). Either of these phenomena reduces the rate of change in the pressure difference between ports A and B. Likewise, if the solenoid valve 18 actuates more slowly due to friction caused by a degraded physical condition, the solenoid valve 18 will also open and close the ports A, B and/or C thereof more slowly, which will also affect the rate of change with respect to time of the pressure difference between ports A and B.

As a result, during the test of the solenoid valve 18 (i.e., when power is removed from the solenoid S of the solenoid valve 18), the DVC 16 may collect and store pressure measurements made by the sensors 40 and 42. During or after the test, the DVC 16 may process these measurements to determine the operational condition of the solenoid valve 18. In particular, the DVC 16 may implement a discrete time domain, digital algorithm as generally defined by equation (1) below to determine the health of the solenoid valve 18.

$$DP = abs((S1-S2)dt) \quad (1)$$

where:
DP=the derivative of the differential pressure with respect to time;
S1=the measurement of the pressure sensor 40; and
S2=the measurement of the pressure sensor 42.
It will be understood, however that other implementations of the same basic calculation or equation are possible and may be used instead.

Equation (1) above may be performed periodically during the solenoid valve test or at separate times associated with the solenoid valve test, to calculate the absolute value of the derivative with respect to time of the differential pressure between the two ports A and B of the solenoid valve 18. The output of this equation reflects the rate of change of the pressure drop of port A with respect to port B of the solenoid valve 18. As will be understood, the value DP will be larger when the pressure difference changes more rapidly, meaning that the solenoid valve operated more quickly in response to the removal of the power from the lines 22. Comparing the quantity DP to an expected threshold, MinDP, provides if this pressure transition is sufficient to constitute a healthy solenoid condition. In other words, solenoid valves which are operating properly and which are free of obstructions, or other binding friction, will rapidly "snap" to the new position, producing a sharp, rapid transition in pressure, resulting in a larger value for DP. Solenoid valves which are clogged, slow to travel, or which do not fully actuate, will produce more sluggish, rounded pressure waveforms, or attenuated pressure differences, thus producing a time-based derivative (DP) which is smaller in amplitude. Solenoid valves which produce a DP valve less than MinDP may be determined to be at risk of failing to perform as expected when required during an actual emergency, and thus may be determined to be faulty or in need of repair or replacement.

In practice, i.e., during an actual test, an external system such as the emergency shutdown controller 20 may command the DVC 16 to initiate a solenoid valve test, which begins by collecting sensor measurements from the sensors 40 and 42 and watching for a pressure pulse at the input of one or more of the sensors 40 and 42. The receipt of this pressure pulse may start the periodic evaluation of equation (1) above. After sending the test signal to the DVC 16, the emergency shutdown controller 20 may then interrupt the solenoid power on the lines 22 for a brief instant. The actual time of the power interruption will depend on the dynamics of the system, but may typically be on the order of tens or hundreds of milliseconds. The time should be long enough to cause full travel of a healthy solenoid at normal operating pressure, but not long enough to cause significant actual movement of the valve 12, thus preventing the introduction of a significant disturbance within the process being controlled. In particular, the sensors 40 and 42, as well as the pneumatic lines connecting these sensors to the ports A and B of the solenoid valve 18 are configured to determine a drop or change in pressure at these ports, but the solenoid valve 18 is not actuated long enough to allow the valve actuator 14 to move very much or to actually move the valve 12 a significant amount. That is, the solenoid valve 18 may be de-energized an amount of time less than or on the order of the dead-time associated with the operation of the solenoid valve, valve actuator, and valve stem configuration, so that by the time the valve 12 actually begins to move, the solenoid valve 18 is re-energized and returned to its normal, non-emergency, condition or state. Of course, this operation assumes that the solenoid valve 18 operates much faster (e.g., orders of magnitude faster) than the valve 12, which is typically the case.

In any event, after power is restored to the solenoid valve 18, the DVC 16 may be polled by, for example, the emergency shutdown controller 20 via the communication network 24 to determine if the signal DP was ever large enough to exceed the expected criterion MinDP. If so, the solenoid valve 18 may be deemed to be healthy. Of course, the calculations of equation (1) above may be made while the solenoid valve is moving from one position to another in response to de-energization of the solenoid S, when the solenoid valve 18 is sitting in the emergency position (i.e., has connected port A to port C) and/or when the solenoid valve 18 is moving from one position to another in response to a re-energization of the solenoid S.

Generally speaking, it will be understood that the value MinDP may be user adjustable or selectable based on the solenoid type, the pressures involved, and the dynamics of the system and may be determined in any desired manner, such as by experimental testing. Still further, the description provided herein is provided in the context of solenoids that are normally powered, and actuators that are normally pressurized.

However, the technique described herein can also be applied in systems where the solenoid is normally unpowered, with power being applied only during an emergency demand condition, and/or where the valve actuator is normally unpressurized, with pressure being applied only during an emergency, or any combination thereof. Still further, while the pressure calculations are described as being performed by the DVC 16 during the test, the pressure calculations may be made based on collected (i.e., stored) pressure signals after the solenoid valve 18 has actuated, i.e., after the test, and/or may be made by any other device, such as by the emergency shutdown controller 20. In this case, the DVC will provide pressure signals from the sensors 40 and 42 either in real time or as stored pressure signals to the emergency shutdown controller 20. Still further, any means of performing the derivative calculation in equation (1) may be performed, including, for example, using periodic digital sampling and digital calculations, using mechanical devices or using analog electronic circuitry.

Figure 2:
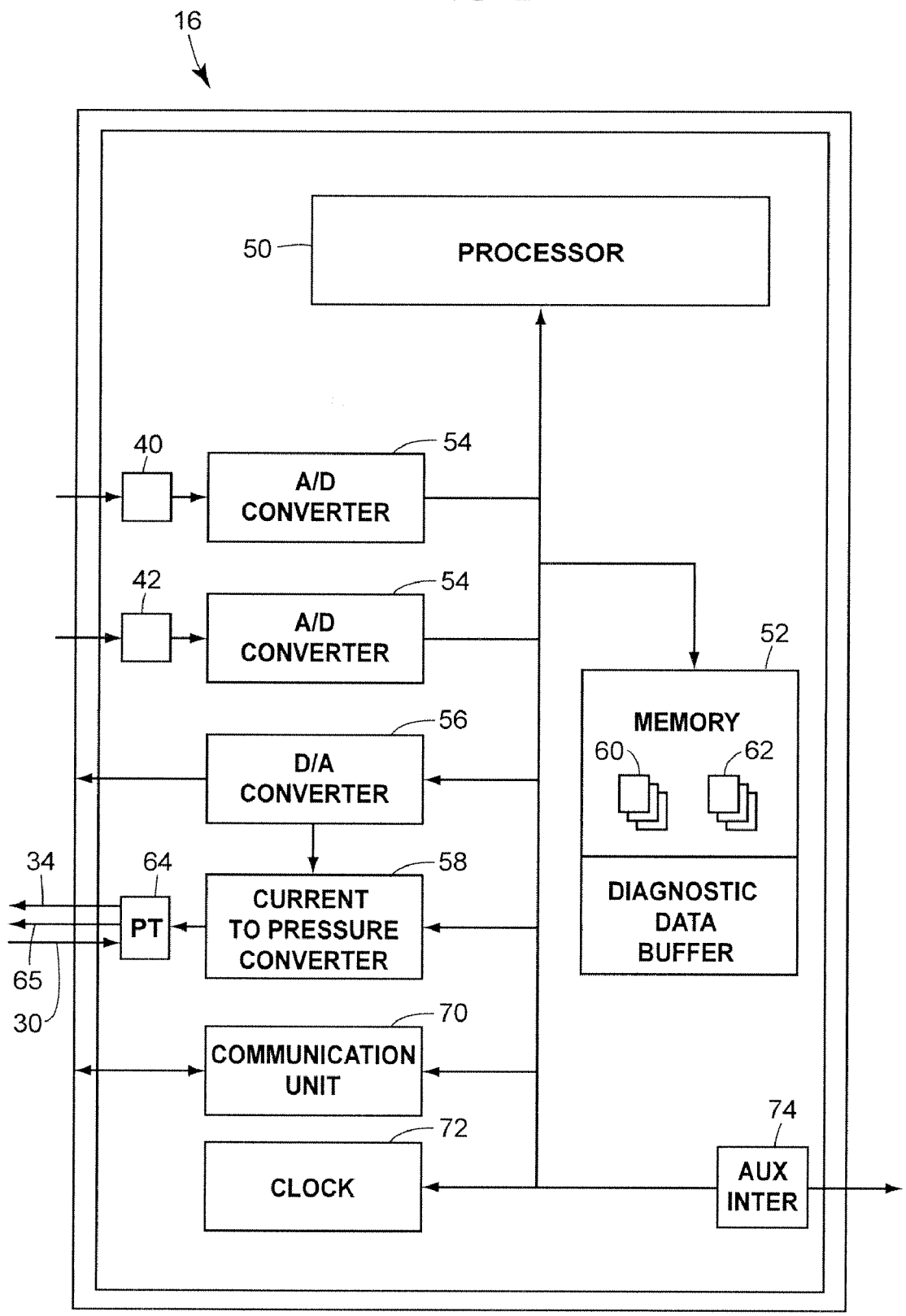
FIG. 2 is a block diagram of a digital valve controller associated with the emergency shutdown system of FIG. 1.

Referring now to FIG. 2, a block diagram of the DVC 16 is illustrated to show some of the internal components associated with the DVC 16. In particular, in addition to the pressure sensors 40 and 42 illustrated in FIG. 1, the DVC 16 includes a processor 50, a memory 52, one or more analog-to-digital (A/D) converters 54, one or more digital-to-analog (D/A) converters 56, and a current-to-pressure converter 58. The memory 52 is utilized to store instructions or scripts, including tests 60 for testing the valve 12 and the valve actuator 14, and tests 62 for testing the solenoid valve 18 and any other associated devices. The memory 52 may also store collected sensor signals and diagnostic data. The A/D converters 54 convert analog sensor inputs, such as signals from the sensors 40 and 42, into digital signals which the processor 50 may process directly and/or store in the memory 52. Other examples of sensor inputs that may be acquired and stored by the DVC 16 include valve stem travel or position signals (or valve plug travel or position signals), output line pressure signals, loop current signals, etc.

The D/A converters 56 may convert a plurality of digital outputs from the processor 50 into analog signals which, in some cases, may be used by the current to pressure converter 58 to control a pressure or pneumatic switch 64. The pneumatic switch 64 couples the pressure supply line 30 (of FIG. 1) to one or more output lines, such as the line 34 of FIG. 1. Of course, the pneumatic switch 64 may also or in some cases, connect the line 34 to an atmospheric line 65 to vent pressurized gas to the atmosphere. Alternatively, the current-to-pressure converter 58 may receive digital signals directly from the processor 50, or may receive analog current signals, such as 4-20 ma current signals from a communication unit 70, to perform pressure switching and controlling functions.

The communication unit 70 serves as an interface to the communication network 24 of FIG. 1. The communication unit 70 may be or include any desired type of communication stack or software/hardware combination associated with any desired communication protocol. As is known, the communication unit 70 may serve to enable signals received by the processor 50 to be communicated to the emergency shutdown controller 20 or any other device connected to the communication network 24, such as a process controller responsible for controlling one or more portions of the process not associated with the valve 12, a user interface or any other device. In particular, the processor 50 may receive and process the pressure signals from the sensors 40 and 42 and may provide one or more of these signals as digital data to be sent via the communication unit 70 and the communication network 24 to other devices. In this manner, one or more of the sensors 40 and 42 may be used to perform measurement activities within the process plant that are not needed for the control and/or testing of the emergency shutdown system 10 of FIG. 1. This feature makes the DVC 16 more versatile and useful in processes or emergency shutdown devices that do not need both of the sensors 40 and 42 for control and/or testing of the components within the emergency shutdown device.

As illustrated in FIG. 2, the DVC 16 may also include a clock 72 and an auxiliary input interface 74 which may be used by the processor 50 to monitor or receive auxiliary inputs such as inputs from electrical switches or other devices connected directly to the DVC 16 via the auxiliary interface 74. Additionally, if desired, the DVC 16 may include a housing 76 which may be an explosion proof housing used to prevent sparks from reaching explosive gasses in a plant, and thus reduce the likelihood that the emergency shutdown system 10 will cause an explosion.

While the DVC 16 has been described as storing and performing stroke tests and integrity tests on the valve 12, the valve actuator 14 and the solenoid valve 18 of FIG. 1, it will be understood that the DVC 16 can also store and implement any other types of or any additional tests that are based on or that use other diagnostic data collected by the DVC 16 in addition to or alternatively to the data collected by the sensors 40 and 42. Sensor or diagnostic data collected during, for example, an emergency shutdown test may be collected by other types of sensors not shown in FIG. 2 and/or may be retrieved using a handheld computing device that may communicate with the DVC 16 via the auxiliary interface 74 or via the communication unit 70. Many possible tests are described in United States Patent Application Publication No. US 2002-0145515 A1, which is hereby expressly incorporated by reference herein. Additionally or alternatively, if desired, the DVC 16 may send collected data back to a main control room via, for example, the emergency shutdown controller 20, for processing by other devices.

Figure 3:
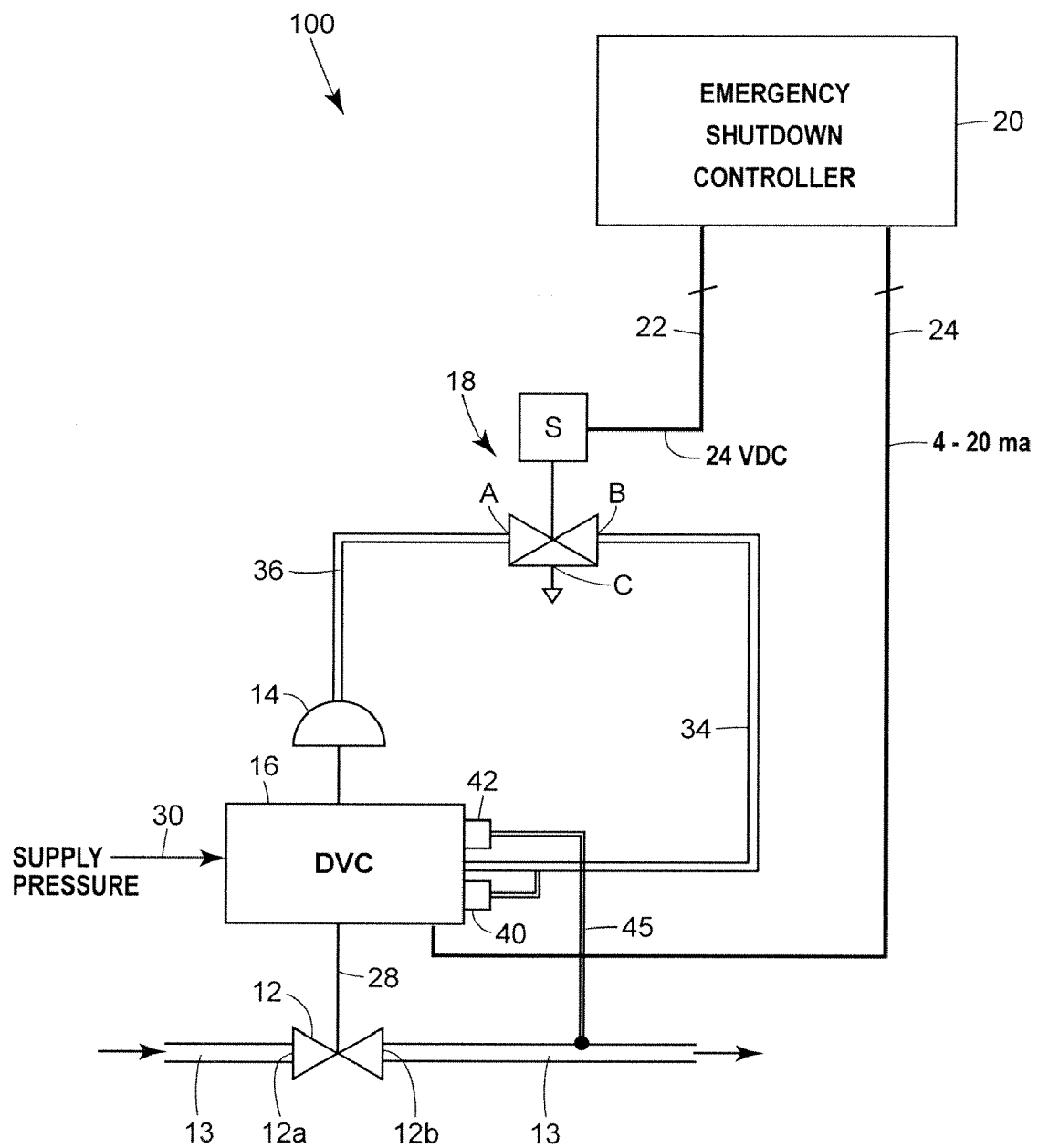
FIG. 3 is a schematic diagram of an example emergency shutdown system including the digital valve controller of FIGS. 1 and 2 configured to operate within the emergency shutdown system as well as to collect a pressure signal not used by or associated with the emergency shutdown system.

FIG. 3 illustrates a different configuration of an emergency shutdown system 100 that uses the DVC 16 of FIGS. 1 and 2 in a slightly different manner. This configuration and that of FIG. 4 described below are provided to indicate only a couple of examples of the many ways in which the DVC 16 described herein is versatile enough to be used in different process plant configurations without being significantly altered. The emergency shutdown system 100 of FIG. 3 is similar to the system 10 of FIG. 1, with like elements having the same reference numbers. In the system 100 of FIG. 3, however, the DVC 16 is not set up to perform the solenoid valve test discussed above, but is instead configured to use the output of the sensor 40 to perform closed loop pressure control of the valve actuator 14 to cause the valve actuator 14 to actuate in any desired manner in response to the receipt of, for example, an emergency shutdown signal at the DVC 16 or to perform testing, such as partial stroke testing, of the valve actuator 14. In this case, the DVC 16 uses the sensor 40 to operate as a pressure transducer for the valve actuator 14 and may provide any type of control of the valve 12.

However, as illustrated in FIG. 3, the second sensor 42 of the DVC 16 may be connected to any desired fluid line within the process to acquire process variable measurements not needed for the control and/or testing of the valve 12, the valve actuator 14 or the solenoid valve 18. While the sensor 42 is illustrated in FIG. 3 as being connected to the outlet 12b of the valve 12, it could instead be connected to any other fluid line or pressure take-off associated with any other process control device or equipment. This other process equipment may, but need not be, associated with the emergency shutdown device 100. Additionally, it will be understood that the output of the sensor 42, which is a process variable, may be stored in and sent by the DVC 16 to other devices, such as to the emergency shutdown controller 20 via the communication network 24, to a handheld device via the main communications controller or the auxiliary interface 74 (FIG. 2), to a distributed controller or a user interface not associated with the emergency shutdown system 100 via the communication network 24 or the auxiliary interface 74, etc. Thus, collection and use of the sensor data from the sensor 42 is not limited to use in an emergency shutdown device or system in which the DVC 16 is located. This feature makes the DVC 16, when used as part of an emergency shutdown system, more versatile because it enables the DVC 16 to provide an auxiliary pressure input to a distributed process control system or to a maintenance system associated with a process plant.

Alternatively, the emergency shutdown device 100 can be configured as shown in FIG. 3, wherein the DVC 16 operates to perform position control of the valve 12, i.e., wherein the DVC 16 operates as a positioner. In this case, however, the sensor 40 may be connected as shown in FIG. 3 to perform pressure control as a fallback control method if a problem occurs with the position control servo loop, such as if a position sensor associated with this loop fails. This fallback control method is described in more detail in U.S. patent application Ser. No. 11/195,281, entitled "System and Method for Transfer of Feedback Control for a Process Control Device," which was filed Aug. 2, 2005, the disclosure of which is hereby expressly incorporated by reference herein. In this case, however, the additional sensor 42 may still be used to measure a pressure signal external to the valve 12 and valve actuator 14 configuration. While the sensor identified by reference numeral 40 has just been described as performing the pressure control in FIG. 3, an alternate embodiment can include either the sensor identified by reference numeral 40 or the sensor identified by reference numeral 42 performing the pressure control as a fallback control method. Additionally, the sensor identified by reference numeral 40 may alternately be used as a pressure sensor for measuring a pressure external to the valve 12 and actuator 14 configuration. Thus, it should be appreciated that either sensor may perform any of the above-described functions, as necessary for a desired application.

Figure 4:
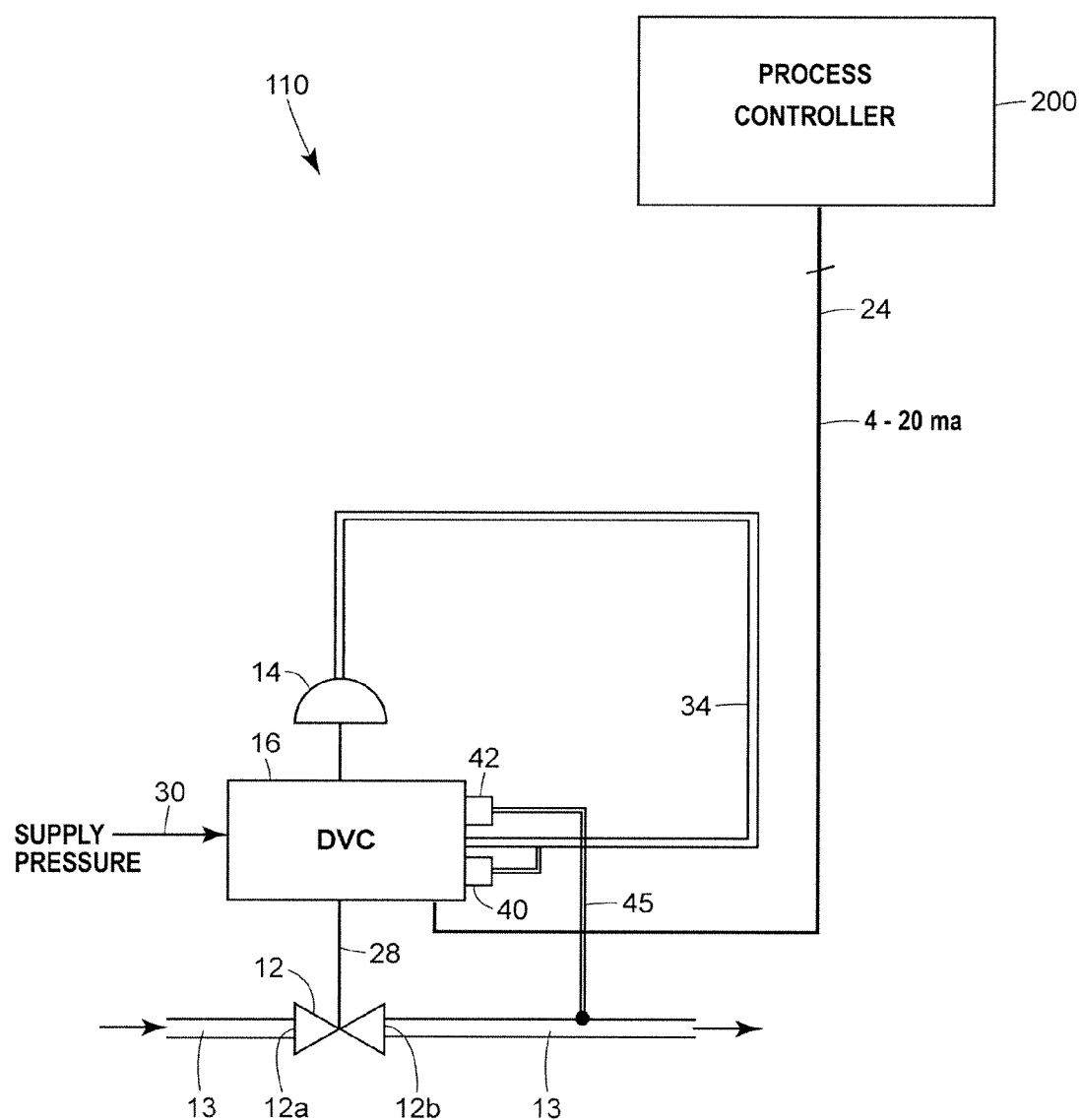
FIG. 4 is a schematic diagram of a typical valve configuration including the digital valve controller of FIGS. 1 and 2 configured to operate to perform valve control within a distributed control system of a process plant to thereby perform closed loop control of a valve as well as to collect one or more auxiliary pressure signals not used for the closed loop control of the valve.

Likewise, FIG. 4 illustrates the DVC 16 of FIGS. 1 and 2 being used in a closed loop valve control configuration 110 to control a valve 12 and a valve actuator 14 combination which are not part of an emergency shutdown device. The closed loop valve control configuration 110 includes elements that are the same as or similar to the system 10 of FIG. 1, with like elements having the same reference numbers. In the configuration 110 of FIG. 4 however, the DVC 16 is illustrated as being connected to a process controller 200 and is used to provide standard servo control of the valve 12 which, in this case, may be a process valve not associated with an emergency shutdown device or system. In this configuration, the sensor 40 of the DVC 16 may be connected to the input of the valve actuator 14 (e.g., may be connected to the pneumatic line 34) to perform pressure control of the valve actuator 14. Here, the DVC 16 operates as a traditional pressure transducer for controlling the valve 12. However, as shown in FIG. 4, the pressure sensor 42 is connected outside of the valve and valve actuator configuration to acquire an external pressure measurement not needed for controlling the valve 12. Thus, in a manner similar to the earlier described configurations, the DVC 16 may allow the process controller 200 to use the sensor 42 as another pressure transmitter disposed within the process plant.

Alternatively, the valve control configuration 110 can be configured as shown in FIG. 4, wherein the DVC 16 operates to perform position control of the valve 12, i.e., so that the DVC 16 operates as a positioner within the process control scheme. In this case, however, the sensor 40 may still be connected as shown in FIG. 4 to perform pressure control as a fallback control method if a problem occurs with the position control loop, such as if a position sensor fails. This fallback control method is described in more detail in U.S. patent application Ser. No. 11/195,281 as noted above.

Still further, while not shown in FIG. 4, if the DVC 16 is used to perform position control of the valve 12, i.e., if the DVC 16 operates as a positioner within the process control scheme, both of the sensors 40 and 42 may be used as external or auxiliary pressure transmitters to measure any desired pressure signals associated with or present within the process plant, including pressure signals not associated with the controlling or testing the valve 12 or the valve actuator 14. Of course, the outputs of the sensors 40 and 42 may be stored in the DVC 16 and/or may be sent to other devices, such as to the process controller 200, to user interface devices (not shown), etc. via for example, the communication network 24.

It will be understood from the description provided above that the DVC 16 may be used in many different process plant configurations and scenarios to provide different pressure measurements for different uses, and that the DVC 16 may be used as part of an emergency shutdown device or as part of a distributed process control device when performing these pressure measurements. While the DVC 16 has been described and illustrated as including two pressure sensors 40 and 42, it will be understood that the DVC 16 is not limited to the use of two pressure sensors, but instead that additional pressure sensors could be provided on the DVC 16 to perform other pressure measurements within the process plant.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

I claim:

1. A method of monitoring a valve control loop having a control valve that is movable between a first position and a shutdown position, a valve controller for controlling actuation of the control valve, a pneumatic line coupled to the valve controller to move the control valve, and a supporting equipment coupled on the pneumatic line to move the control valve, the method comprising:
   activating the supporting equipment;
   determining a pressure differential between two distinct locations on the pneumatic line while activating the supporting equipment; and
   determining an operational characteristic of the supporting equipment based on the pressure differential,
   wherein determining a pressure differential includes:
   detecting a first pressure at a first location on the pneumatic line;
   detecting a second pressure at a second location on the pneuamtic line that is distinct from the first location; and
   calculating a difference between the first pressure and the second pressure,
   wherein determining an operational characteristic of the supporting equipment includes determining a rate of change of the pressure differential and comparing the rate of change to a threshold rate.

2. The method of claim 1, wherein determining a rate of change of the pressure differential includes calculating a derivative of the pressure differential over time.

3. The method of claim 1, wherein determining a pressure differential includes:
   detecting a plurality of first pressures at a first location on the pneumatic line, the plurality of first pressures corresponding to a plurality of instances while activating the supporting equipment;
   detecting a plurality of second pressures at a second location on the pneumatic line, the plurality of second pressures corresponding to the plurality of instances;
   determining a plurality of pressure differentials based on differences between the plurality of first pressures and the plurality of second pressures; and
   determining a rate of change of the plurality of pressure differentials.

4. The method of claim 3, wherein determining an operational characteristic of the supporting equipment includes comparing the rate of change of the plurality of pressure differentials to a threshold rate.

5. The method of claim 4, wherein the rate of change is a maximum rate of change.

6. The method of claim 1, wherein determining a pressure differential between two distinct locations on the pneumatic line includes detecting an inlet pressure at an inlet of the supporting equipment and an outlet pressure at an outlet of the supporting equipment.

7. The method of claim 1, wherein activating the supporting equipment includes activating the supporting equipment for a period of time that causes substantially no movement of the control valve.

8. The method of claim 1, wherein activating the supporting equipment includes activating the supporting equipment for a period of time that is less than or equal to a dead-time of the control valve.

9. The method of claim 1, wherein activating the supporting equipment includes venting a fluid from the pneumatic line.

10. A method of monitoring a valve control loop having a control valve that is movable between a first position and a shutdown position, a valve controller for controlling actuation of the control valve, a pneumatic line coupled to the valve controller to move the control valve, and a supporting equipment coupled on the pneumatic line to move the control valve, the method comprising:
   activating the supporting equipment;
   determining a pressure differential between two distinct locations on the pneumatic line while activating the supporting equipment; and
   determining an operational characteristic of the supporting equipment based on the pressure differential,
   wherein determining a pressure differential includes:
   detecting a plurality of first pressures at a first location on the pneumatic line, the plurality of first pressures corresponding to a plurality of instances while activating the supporting equipment,
   detecting a plurality of second pressures at a second location on the pneumatic line, the plurality of second pressures corresponding to the plurality of instances,
   determining a plurality of pressure differentials based on differences between the plurality of first pressures and the plurality of second pressures, and
   determining a rate of change of the plurality of pressure differentials, and
   wherein determining an operational characteristic of the supporting equipment includes comparing the rate of change of the plurality of pressure differentials to a threshold rate.

11. The method of claim 10, wherein the rate of change is a maximum rate of change.

12. The method of claim 10, wherein determining a plurality of pressure differentials between two distinct locations on the pneumatic line includes detecting a plurality of inlet pressures at an inlet of the supporting equipment and a plurality of outlet pressures at an outlet of the supporting equipment.

13. The method of claim 10, wherein activating the supporting equipment includes activating the supporting equipment for a period of time that causes substantially no movement of the control valve.

14. The method of claim 10, wherein activating the supporting equipment includes activating the supporting equipment for a period of time that is less than or equal to a dead-time of the control valve.

15. The method of claim 10, wherein activating the supporting equipment includes venting a fluid from the pneumatic line.

* * * * *

UNITED STATES PATENT AND TRADEMARK OFFICE
CERTIFICATE OF CORRECTION

PATENT NO. : 8,104,495 B2
APPLICATION NO. : 12/582126
DATED : January 31, 2012
INVENTOR(S) : Jimmie L. Snowbarger Page 1 of 1

It is certified that error appears in the above-identified patent and that said Letters Patent is hereby corrected as shown below:

In the Claims:

At Column 12, line 61, "pneuamtic" should be -- pneumatic --.

Signed and Sealed this
Twenty-fifth Day of June, 2013

Teresa Stanek Rea
*Acting Director of the United States Patent and Trademark Office*